United States Patent
Ginsburg

(10) Patent No.: US 10,061,016 B2
(45) Date of Patent: Aug. 28, 2018

(54) PHASE NOISE MEASUREMENT IN A CASCADED RADAR SYSTEM

(71) Applicant: Texas Instruments Incorporated, Dallas, TX (US)

(72) Inventor: Brian Paul Ginsburg, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 742 days.

(21) Appl. No.: 14/584,772

(22) Filed: Dec. 29, 2014

(65) Prior Publication Data

US 2016/0187464 A1 Jun. 30, 2016

(51) Int. Cl.
  *G01S 7/40* (2006.01)
  *G01S 13/87* (2006.01)
  *G01S 13/93* (2006.01)

(52) U.S. Cl.
  CPC .......... *G01S 7/4008* (2013.01); *G01S 13/87* (2013.01); *G01S 13/931* (2013.01)

(58) Field of Classification Search
  CPC ........ G01S 13/931; G01S 7/40–7/4021; G01S 13/87–13/872
  See application file for complete search history.

(56) References Cited

U.S. PATENT DOCUMENTS

| | | | | |
|---|---|---|---|---|
| 9,257,939 B1* | 2/2016 | Zhang | ................... | H03B 5/1212 |
| 9,478,858 B1* | 10/2016 | West | ..................... | G01S 13/953 |
| 2005/0156781 A1* | 7/2005 | Coleman | ................. | G01S 7/282 |
| | | | | 342/174 |
| 2007/0210955 A1* | 9/2007 | McEwan | ................. | G01S 7/285 |
| | | | | 342/175 |
| 2014/0232586 A1 | 8/2014 | Ygnace | | |
| 2014/0266345 A1 | 9/2014 | Matsumura | | |
| 2015/0130658 A1* | 5/2015 | Hennegan | ............... | G01S 7/032 |
| | | | | 342/175 |
| 2015/0241553 A1* | 8/2015 | Gehrels | ..................... | G01S 7/40 |
| | | | | 342/173 |
| 2016/0146931 A1* | 5/2016 | Rao | ..................... | H01Q 1/3233 |
| | | | | 342/59 |
| 2016/0187462 A1* | 6/2016 | Altus | ........................ | G01S 7/35 |
| | | | | 342/175 |
| 2016/0187464 A1* | 6/2016 | Ginsburg | .............. | G01S 7/4008 |
| | | | | 342/168 |
| 2017/0023663 A1* | 1/2017 | Subburaj | ................... | G01S 7/40 |

(Continued)

OTHER PUBLICATIONS

S. H. Ismail, E. A. Soliman and S. A. Mahmoud, "Cascaded third-order tunable low-pass filter using low voltage low power OTA," 2011 International Symposium on Integrated Circuits, Singapore, 2011, pp. 488-491.*

(Continued)

*Primary Examiner* — Matthew M Barker
(74) *Attorney, Agent, or Firm* — Lawrence J. Bassuk; Charles A. Brill; Frank D. Cimino

(57) ABSTRACT

A cascaded radar system is provided that includes a master radar system-on-a-chip (SOC) with transmission signal generation circuitry and a slave radar SOC coupled to an output of the master radar SOC to receive a signal from the transmission signal generation circuitry of the master SOC. In this system, the slave radar SOC is operable to measure phase noise in the signal received from the transmission signal generation circuitry of the master SOC.

17 Claims, 3 Drawing Sheets

(56) References Cited

U.S. PATENT DOCUMENTS

2017/0090015 A1* 3/2017 Breen .................. G01S 7/4004
2017/0163351 A1* 6/2017 Puleri .................... H04B 10/64

OTHER PUBLICATIONS

"Advanced Driver Assistance (ADAS) Solutions Guide", SLYY044, Texas Instruments, Inc., 2013, pp. 1-29.

Donald E. Barrick, "FM/CW Radar Signals and Digital Processing", NOAA Technical Report ERL 283-WPL 26, U.S. Department of Commerce, National Oceanic and Atmospheric Administration, Environmental Research Laboratories, Boulder, CO, Jul. 1973, pp. 1-28.

Ruben Undheim, "Design of a Linear FMCW Radar Synthesizer with Focus on Phase Noise", Norwegian University of Science and Technology, Feb. 2012, pp. 1-166.

Waleed Khalil et al, "A Self-Calibrated On-Chip Phase-Noise Measurement Circuit With −75 dBc Single-Tone Sensitivity at 100 kHz Offset", IEEE Journal of Solid-State Circuits, vol. 42, No. 12, Dec. 2007, pp. 2758-2765.

* cited by examiner

PHASE NOISE MEASUREMENT IN A CASCADED RADAR SYSTEM

BACKGROUND OF THE DISCLOSURE

Field of the Disclosure

Embodiments of the present disclosure generally relate to radar systems, and more specifically relate to measurement of phase noise in a cascaded radar system.

Description of the Related Art

A new class of safety systems, referred to as advanced driver assistance systems (ADAS), has been introduced into automobiles to reduce human operation error. These systems are enabled by smart sensors based primarily on millimeter-wave automotive radars. The proliferation of such assistance systems, which may provide functionality such as rear-view facing cameras, electronic stability control, and vision-based pedestrian detection systems, has been enabled in part by improvements in microcontroller and sensor technologies. Enhanced embedded radar-based solutions are enabling complementary safety features for ADAS designers.

In an automotive radar system, one or more radar sensors may be used to detect obstacles around the vehicle and the speeds of the detected objects relative to the vehicle. A processing unit in the radar system may determine the appropriate action needed, e.g., to avoid a collision or to reduce collateral damage, based on signals generated by the radar sensors. Current automotive radar systems are capable of detecting objects and obstacles around a vehicle, the position of any detected objects and obstacles relative to the vehicle, and the speed of any detected objects and obstacles relative to the vehicle. Via the processing unit, the radar system may, for example, alert the vehicle driver about potential danger, prevent a collision by controlling the vehicle in a dangerous situation, take over partial control of the vehicle, or assist the driver with parking the vehicle.

Automotive radar systems are required to meet the functional safety specifications of International Standard 26262 titled "Road Vehicles—Functional Safety." ISO 26262 defines functional safety as the absence of unreasonable risk caused by malfunctioning behavior of electrical/electronic systems. Functional safety in automotive radar is the prevention of harm to humans due to failure of components in the radar. For automotive radar, the radar should be known to be functioning appropriately within a fault tolerant time interval of approximately 100 milliseconds (ms). Thus, while the vehicle is operating, a failure in any part of the radar that would lead to a degraded signal-to-noise ratio (SNR) should be detected, and an appropriate response performed within approximately 100 ms.

Phase noise has an important degradation effect in automotive radar systems such as Frequency Modulated Continuous Wave (FMCW) radar systems as an unacceptable level of phase noise may mask out objects with weaker signals since objects are detected at frequency offsets of the carrier. Automotive radar systems are typically designed to minimize phase noise but when in use in a vehicle, the phase noise may degrade (increase) due to a failure in the system, e.g., a transistor or piece of metal breaks. Therefore, to meet functional safety standards, it is important to monitor phase noise during vehicle operation and generate an appropriate response when the phase noise degrades to an unacceptable level. A typical requirement is to alert the vehicle driver if phase noise increases by approximately 12 decibels (dB).

SUMMARY

Embodiments of the present disclosure relate to methods and apparatus for phase noise measurement in a cascaded radar system. In one aspect, a cascaded radar system is provided that includes a master radar system-on-a-chip (SOC) including transmission signal generation circuitry, and a slave radar SOC coupled to an output of the master radar SOC to receive a signal from the transmission signal generation circuitry, the slave radar SOC operable to measure phase noise in the signal.

In one aspect, a method for phase noise measurement in a cascaded radar system is provided that includes receiving a signal in a first radar device of the cascaded radar system, the signal generated by first transmission signal generation circuitry of a second radar device, and measuring phase noise in the signal in the first radar device.

In one aspect, a radar device configured to operate in a normal mode and a phase noise measurement mode is provided that includes first transmission signal generation circuitry operable to generate a reference signal when the radar device is in phase noise measurement mode and to generate signals for transmission when the radar device is in normal mode, an input buffer coupled to second transmission signal generation circuitry of another radar device to receive a signal for phase noise measurement from the second transmission signal generation circuitry when the radar device is in phase noise measurement mode, at least one receive channel including a baseband filter chain, and phase detection circuitry coupled to an output of the first transmission signal generation circuitry to receive the reference signal, to an output of the input buffer to receive the signal from the input buffer, and to an input of the baseband filter chain, the phase detection circuitry operable when the radar device is in phase noise measurement mode to generate a phase noise test signal of a phase difference between the signal and the reference signal and to send the phase noise test signal to the input of the baseband filter chain.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Figure 1:
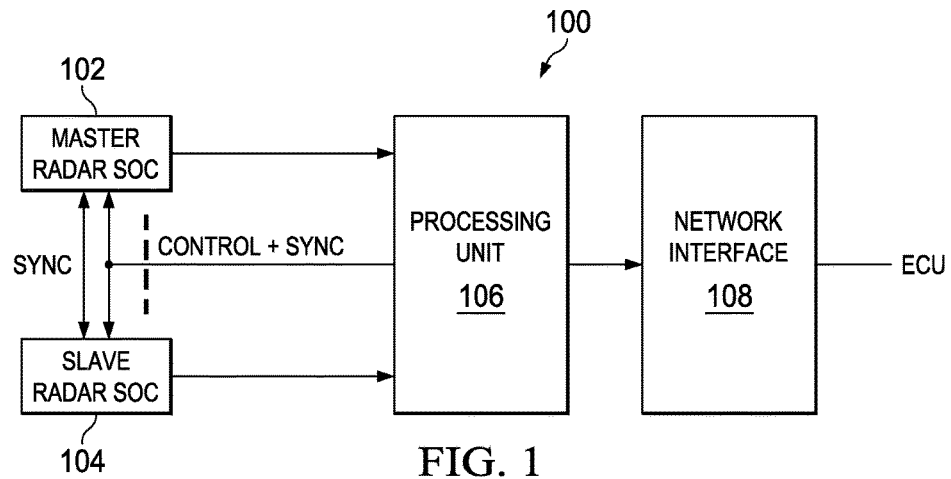
FIG. 1, FIG. 2, and FIG. 3 are block diagrams illustrating an example cascaded Frequency Modulated Continuous Wave (FMCW) radar system.

Specific embodiments of the disclosure will now be described in detail with reference to the accompanying figures. Like elements in the various figures are denoted by like reference numerals for consistency.

As previously mentioned, degradation (increase) in phase noise in an automotive radar system such as a FMCW radar system is a functional safety risk as an increase in phase noise can significantly degrade the dynamic range of the radar, allowing objects with stronger returns to mask objects with weaker returns. Embodiments of the disclosure provide for high accuracy phase noise measurement in a cascaded radar system as the radar system is used in an operating vehicle. More specifically, phase noise measurement is provided for a cascaded radar system implemented with a master radar system-on-a-chip (SOC) and one or more slave radar SOCs. In such a system, transmission signal generation circuitry such as, for example, a radio frequency synthesizer, in the master radar SOC provides the transmission signal (which may also include the local oscillator (LO) signal) for the master radar SOC and the one or more slave radar SOCs. As is explained in more detail herein, at least one of the slave radar SOCs is configured to measure the phase noise in the transmission signal generation circuitry of the master SOC. In some embodiments, the master radar SOC may also be configured to measure the phase noise in the transmission signal generation circuitry of the slave SOC.

Figure 2:
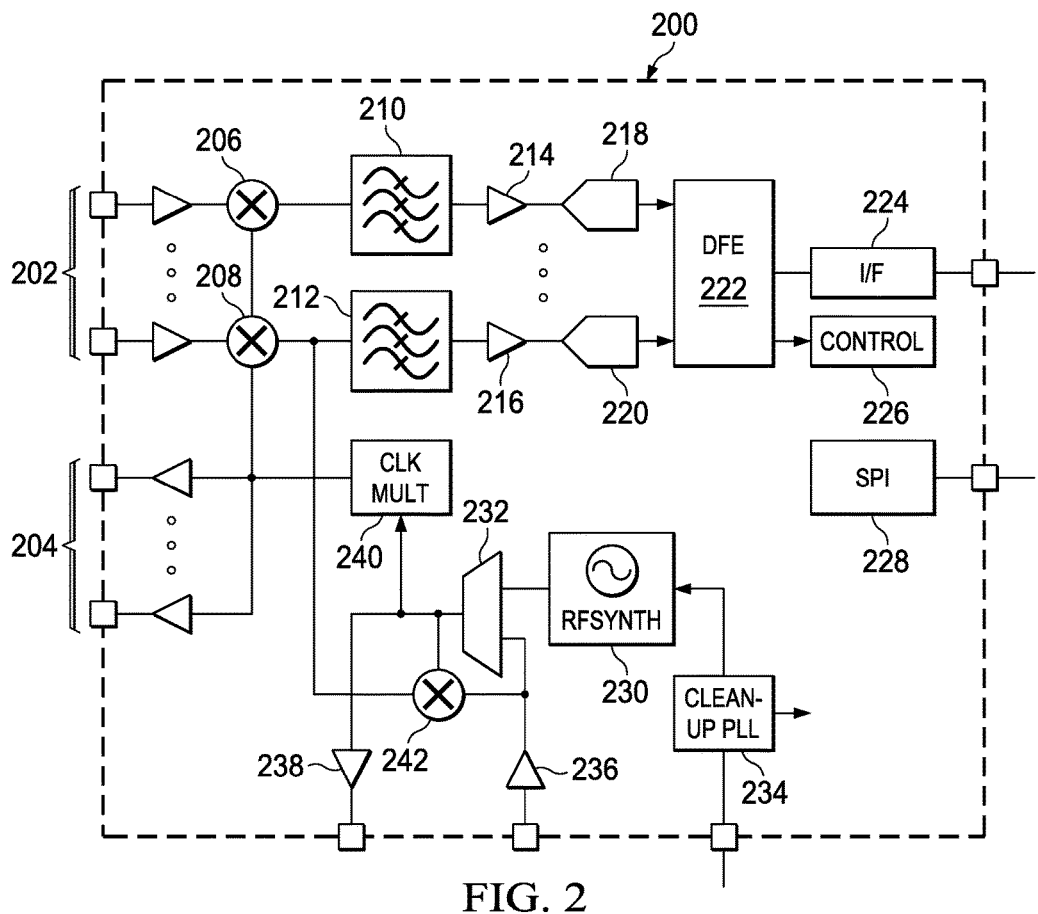
Figure 3:
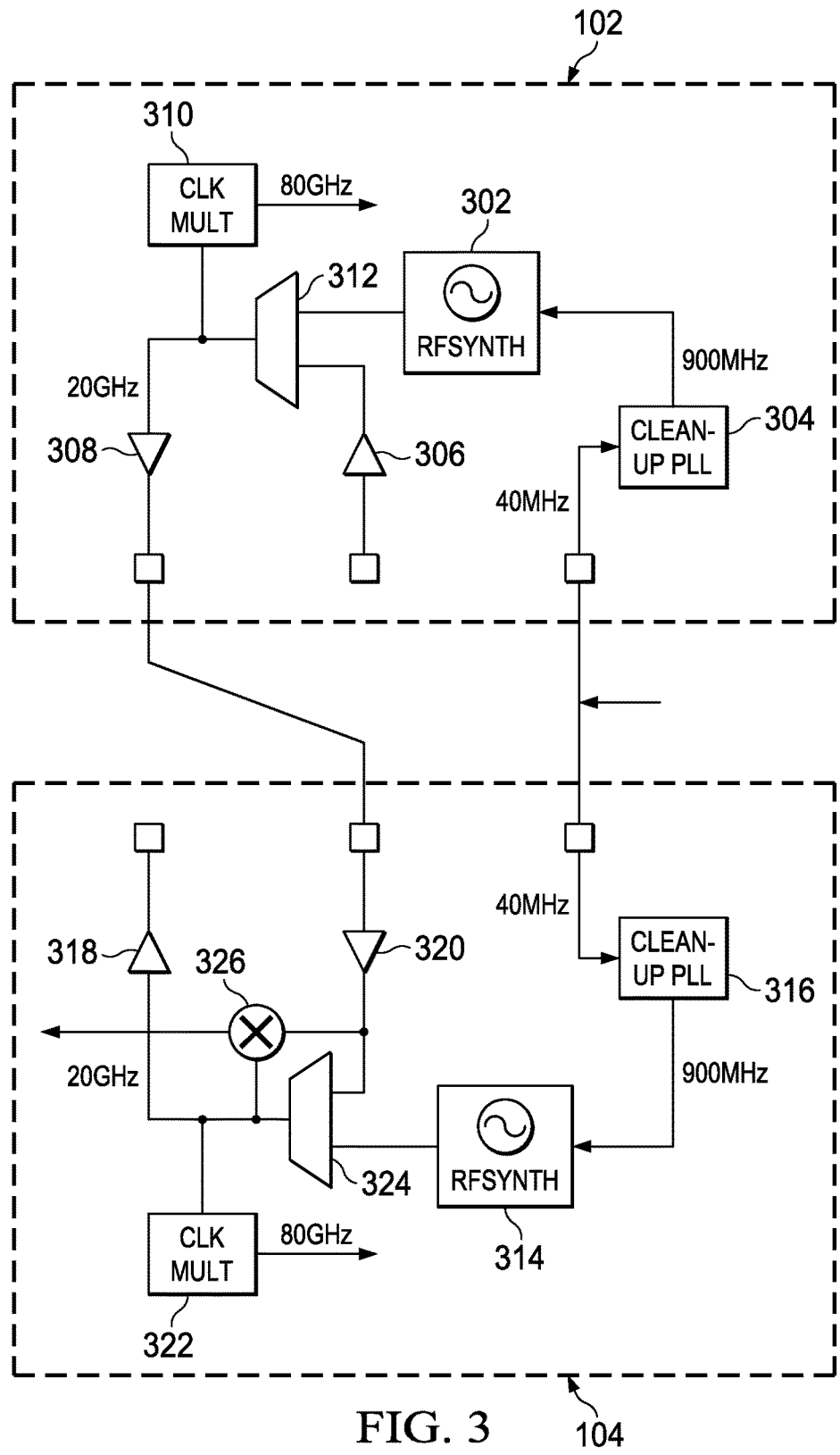

FIGS. 1, 2, and 3 are block diagrams of an example cascaded FMCW radar system 100 configured to perform phase noise measurement during operation of the radar system 100 in a vehicle. FIG. 1 illustrates the top level architecture of the cascaded radar system 100, FIG. 2 illustrates an example FMCW radar SOC suitable for use as the master radar SOC 102 and slave radar SOC 104 of FIG. 1, and FIG. 3 provides a more detailed view of the configuration of the radar system 100 for phase noise measurement.

Referring now to FIG. 1, the example cascaded FMCW radar system 100 includes a master radar SOC 102, a slave radar SOC 104, a processing unit 106, and a network interface 108. The master radar SOC 102 and the slave radar SOC 104 each have the architecture of the example FMCW radar SOC of FIG. 2. Further, the master radar SOC 102 is coupled to the slave radar SOC 104 to synchronize the operation of the slave radar SOC 104 with that of the master radar SOC 102. The master radar SOC 102 and the slave radar SOC 104 are referred to collectively herein as the radar system frontend or the frontend.

The master radar SOC 102 and the slave radar SOC 104 are coupled to the processing unit 106 via a high speed serial interface. As is explained in more detail in reference to FIG. 2, each radar SOC 102,104 includes functionality to generate multiple digital beat signals (alternatively referred to as dechirped signals, intermediate frequency (IF) signals, or raw radar signals) that are provided to the processing unit 106 via the high speed serial interface.

The processing unit 106 includes functionality to process the received beat signals to determine, for example, distance, velocity, and angle of any detected objects. The processing unit 106 may also include functionality to perform post processing of the information about the detected objects, such as tracking objects, determining rate and direction of movement, etc. The processing unit 106 may include any suitable processor or combination of processors as needed for the processing throughput of the application using the radar data. For example, the processing unit 106 may include a digital signal processor (DSP), a microcontroller (MCU), an SOC combining both DSP and MCU processing, or a field programmable gate array (FPGA) and a DSP.

The processing unit 106 provides control information as needed to one or more electronic control units in the vehicle via the network interface 108. Electronic control unit (ECU) is a generic term for any embedded system in a vehicle that controls one or more the electrical system or subsystems in the vehicle. Types of ECU include, for example, electronic/engine control module (ECM), powertrain control module (PCM), transmission control module (TCM), brake control module (BCM or EBCM), central control module (CCM), central timing module (CTM), general electronic module (GEM), body control module (BCM), and suspension control module (SCM).

The network interface 108 may implement any suitable protocol, such as, for example, the controller area network (CAN) protocol, the FlexRay protocol, or Ethernet protocol.

Referring now to FIG. 2, the example FMCW radar SOC 200 depicted is configured to be used as the master radar SOC 102 or the slave radar SOC 104 in the radar system 100. Further, the radar SOC 200 is configured to perform phase noise measurement of the radio frequency synthesizer of a master radar SOC when used as a slave radar SOC.

The radar SOC 200 may include multiple transmit channels 204 for transmitting FMCW signals and multiple receive channels 202 for receiving the reflected transmitted signals. Further, the number of receive channels may be larger than the number of transmit channels. For example, an embodiment of the radar SOC 200 may have two transmit channels and four receive channels. A transmit channel includes a suitable transmitter and antenna. A receive channel includes a suitable receiver and antenna. Further, each of the receive channels 202 are identical and include a mixer 206, 208 to mix the transmitted signal with the received signal to generate a beat signal, a baseband bandpass filter 210, 212 for filtering the beat signal, a variable gain amplifier (VGA) 214, 216 for amplifying the filtered beat signal, and an analog-to-digital converter (ADC) 218, 220 for converting the analog beat signal to a digital beat signal. The bandpass filter, VGA, and ADC of a receive channel may be collectively referred to as a baseband chain or baseband filter chain.

The receive channels 202 are coupled to a digital front end (DFE) 222 that performs decimation filtering on the digital beat signals to reduce the data transfer rate. The DFE 222 may also perform other operations on the digital beat signals, e.g., DC offset removal. The DFE 222 is coupled to a high speed serial interface (I/F) 224 that transfers the output of the DFE 222 to the processing unit 106.

The control module 226 includes functionality to control the operation of the radar SOC 200 in normal mode and in phase noise measurement mode. The control module 226 may include, for example, a buffer to store the output samples of the DFE 222, an FFT (Fast Fourier Transform) engine to compute spectral information of the buffer contents, and an MCU that executes firmware to control the operation of the radar SOC 200 in normal mode and in phase noise measurement mode. Functionality of the control module 226 is described in more detail in reference to FIGS. 3 and 4.

The serial peripheral interface (SPI) 228 provides an interface for communication with the processing unit 106. For example, the processing unit 106 may use the SPI 228 to send control information, e.g., timing and frequencies of chirps, output power level, triggering of monitoring functions such as phase noise monitoring, etc., to the radar SOC 200. The radar SOC 200 may use the SPI 228, for example, to send the results of phase noise measurement and other monitoring functions to the processing unit 106.

The radio frequency synthesizer (RFSYNTH) 230 includes functionality to generate FMCW signals for transmission. In some embodiments, the RFSYNTH 230 includes a phase locked loop (PLL) with a voltage controlled oscillator (VCO), and a programmable ramp generator that is programmed by the control module 226. If the radar SOC 230 is used as the slave radar SOC, the RFSYNTH 230 is active when the radar system frontend is in phase noise measurement mode and is not active when the radar system frontend is operating in normal mode.

The multiplexer 232 is coupled to the RFSYNTH 230 and the input buffer 236. If the radar SOC 200 is used as the slave radar SOC 104, the radar SOC 200 receives signals generated by the RFSYNTH of the master radar SOC 102 via the buffer 236. The multiplexer 232 is configurable to select between signals received in the input buffer 236 and signals generated by the RFSYNTH 230.

The output buffer 238 is coupled to the multiplexer 232 and may be used to transmit signals selected by the multiplexer 232 to the input buffer of another radar SOC.

The clock multiplier 240 increases the frequency of the transmission signal (LO signal) to the LO frequency of the mixers 206, 208. In the radar system 100, the transmission signal for the master radar SOC 102 and the slave radar SOC 104 is generated by the RFSYNTH of the master radar SOC 102.

The clean-up PLL (phase locked loop) 234 operates to increase the frequency of the signal of an external low frequency reference clock (not shown) to the frequency of the RFSYNTH 234 and to filter the reference clock phase noise out of the clock signal.

The test mixer 242, e.g., a linear (real) mixer, receives input signals from the RFSYNTH 230 via the multiplexer 232 and the input buffer 236. The output of the text mixer 242 is coupled to the input of the bandpass filter 212. The output signal of the test mixer 242, which may be referred to as the phase noise test signal herein, is the difference frequency between the two input signals and the sum of the phase noise in the two input signals. The test mixer is activated on the radar SOC 200 when the radar SOC is the slave radar SOC 104 and the radar system frontend is in phase noise measurement mode. In some embodiments, the test mixer 242 is not used when the radar SOC 200 is the master radar SOC 102.

Referring now to FIG. 3, the block diagram provides a more detailed view of the configuration of the radar system 100 for measuring phase noise in the RFSYNTH 302 of the master radar SOC 102. An external clock (not shown) provides a reference clock signal for both the master RFSYNTH 302 and the slave RFSYNTH 314 via the master clean-up PLL 304 and the slave clean-up PLL 316. The output buffer 308 of the master radar SOC 102 is coupled to the input buffer 320 of the slave radar SOC 104. In some embodiments, the output buffer 318 of the slave radar SOC 104 and the input buffer 306 of the master radar SOC 102 are not coupled externally and are not used.

The master multiplexer 312 is configured to select the output signal of the master RFSYNTH 302 in both normal mode and phase noise measurement mode. This output signal is sent to the slave radar SOC 104 via the master output buffer 308. When the radar system frontend is in normal mode, the master RFSYNTH 302 is programmed by the master control module (not shown) to generate FMCW signals for transmission. The generated signals are sent to the slave radar SOC 104 via the output buffer 308 and are provided to the master transmit and receive channels (not shown) via the clock multiplier 310. Configuration of the master RFSYNTH 302 when the radar system frontend is in phase noise measurement mode is described in reference to the method of FIG. 4.

When the radar system frontend is in normal mode, the slave RFSYNTH 314 is not active and the slave multiplexer 324 is configured to select the output of the slave input buffer 320. Further, the test mixer 326 is not active. The FMCW signals from the master radar SOC 102 are provided to the slave transmit and receive channels (not shown) via the clock multiplier 322. Configuration of the slave RFSYNTH 314 and the slave multiplexer 324 when the radar system frontend is in phase noise measurement mode is described in reference to the method of FIG. 4.

Figure 4:
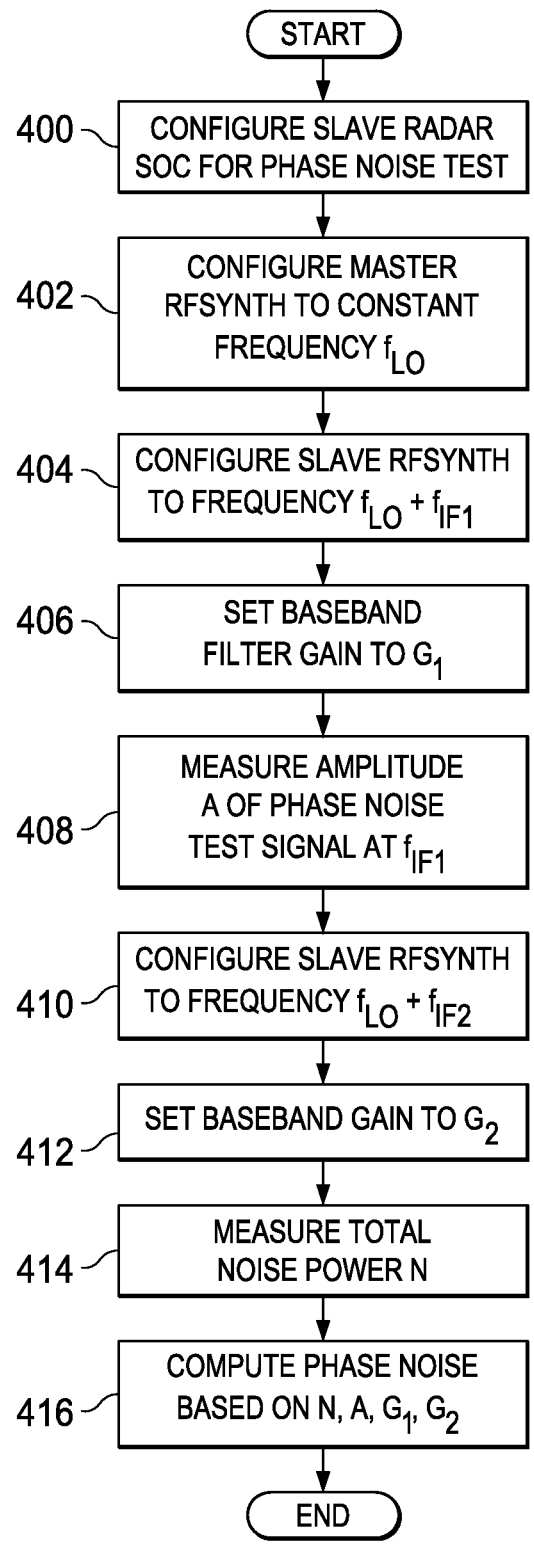
FIG. 4 is a flow diagram of a method for phase noise measurement in a cascaded radar system.

FIG. 4 is a flow diagram of a method for phase noise measurement in a cascaded radar system such as the radar system of FIGS. 1, 2, and 3. The method is described in reference to the block diagrams of these figures. The method can be performed while the radar system is in use in an operating vehicle. For example, the method may be performed during the time period the processing unit 100 is processing a frame of radar data received from the frontend.

To perform the phase noise measurement, the frontend of the radar system 100 is activated in phase noise measurement mode. Once this mode is activated, the control module of the slave radar SOC 104 configures 400 the SOC for phase noise measurement. This configuration process includes disabling the slave receiver mixer 208 of the receiver channel to be used for processing the phase noise test signal during the phase noise measurement, enabling the slave test mixer 326, and coupling the output of the slave mixer 326 to the input of the bandpass filter 212 in the receiver channel to be used for processing the phase noise test signal output by the slave test mixer 326. This configuration process further includes coupling the slave multiplexer 324 to the output of the slave RFSYNTH 314 rather than to the slave input buffer 320.

Further, the control module of the master radar SOC 102 configures 402 the master RFSYNTH 302 to output a signal at a constant frequency $f_{LO}$, e.g., 19 GHz (gigaHertz). This signal may be referred to as the signal-under-test (SUT) herein. The SUT is one input to the slave test mixer 326.

The slave control module further configures the slave SOC to measure the amplitude A of the phase noise test signal output by the slave test mixer 206. More specifically, the slave control module configures 404 the slave RFSYNTH 314 to output a reference signal at frequency $f_{LO}+f_{IF1}$, where $f_{IF1}$ is in the passband of the bandpass filter. The intermediate frequency $f_{IF1}$ may be, for example, 1 MHz (megaHertz). The slave control module further sets 406 the gain of the VGA in the receiver channel to a gain $G_1$, e.g., 0 dB. With this configuration, the slave control module measures 408 the amplitude A of the phase noise test signal at $f_{IF1}$. Note that because the output of the slave test mixer 326 is coupled to the input of the bandpass filter of a receiver channel, the phase noise test signal is processed in a similar fashion to a signal received by one of the receivers, i.e., the signal is filtered, amplified, and converted from an analog signal to a digital signal prior to measuring the amplitude.

The slave control module then configures the slave SOC 104 to measure the total noise power N in the phase noise test signal. More specifically, the slave control module configures 410 the slave RFSYNTH 314 to output a reference signal at frequency $t_{LO}+f_{IF2}$, where $f_{IF2}$ is in the lower stopband of the bandpass filter. In general, a bandpass filter with a center frequency $f_c$ has two stopbands with 0<stopband 1<$f_c$<stopband 2. The lower stopband is stopband 1. The intermediate frequency $f_{IF2}$ may be, for example, 10 kHz (kilohertz). The slave control module further sets the gain of the VGA in the receiver channel to a gain $G_2$, e.g., 26 dB. In general, $G_2>G_1$. With this configuration, the slave control module measures 414 the total noise power N over $[f_{IG1}-\Delta, f_{IF1}+\alpha]$ where the value of $\Delta$ is selected as a tradeoff between computation time (smaller $\Delta$ takes longer to measure) and accuracy (larger $\Delta$ is less accurate). In some embodiments, $\Delta$=10 kHz.

For the amplitude measurement, the value of $f_{IF1}$ is chosen to be near the frequency offset where phase noise degradation is problematic. This is typically in the passband of the bandpass filter. For the measurement of the total noise power, the value of $f_{IF2}$ is chosen to be somewhere in the stop band of the bandpass filter. Thus, during the total noise power measurement, the amplitude of the carrier (at $f_{IF2}$) is suppressed by the bandpass filter, but the amplitude of the phase noise (near $f_{IF1}$) is allowed to pass through. This significantly relaxes the dynamic range of the ADC because the ADC does not have to simultaneously handle the full scale carrier and phase noise in a single measurement.

During the amplitude measurement, the carrier at $f_{IF1}$ is very large and may saturate the ADC. Therefore, the gain $G_1$ is chosen to be small so that the ADC does not saturate while the carrier is in the bandpass filter passband. During the total noise power measurement, the carrier is in the stopband of the filter and heavily attenuated before the ADC. Therefore the VGA gain can be increased to G2>G1 so that the phase noise is amplified. The value of G2 is chosen so that the phase noise is amplified beyond the noise floor of the ADC. The expectation is that the ratio G2/G1 is known.

The slave control module then computes 416 the phase noise PN based on the measured total noise power N, the amplitude A, and the two gain values, i.e., $$PN=N-10 \log 10(A)-A-G_2+G_1,$$

assuming N and A are in dBm (Decibel milliwatts), and G1 and G2 are in dB. The computed phase noise measurement may then be used to determine whether the current level of phase noise in the master RFSYNTH 302 is acceptable. For example, the value of PN may be compared to a noise threshold to decide whether or not the current amount of phase noise is acceptable.

Once the phase noise measurement is complete, the slave control module reconfigures the slave SOC 104 for normal operation. Such reconfiguration includes coupling the slave multiplexer 324 to the slave input buffer 320, disabling the slave RFSYNTH 314, enabling the slave receiver mixer that was disabled, and disconnecting the output of the slave mixer 326 from the input of the bandpass filter.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which the phase noise measurement processing is performed in the control module of the slave radar SOC. One of ordinary skill in the art will understand embodiments in which some or all of the phase noise measurement processing is performed external to the SOC, e.g., by the processing unit or by an external MCU.

In another example, embodiments have been described herein in which a clock multiplier is used. One of ordinary skill in the art will understand embodiments in which the multiplier is not needed because the RFSYNTH operates at the LO frequency rather than a lower frequency.

In another example, embodiments have been described herein in which an internal FFT engine in the slave control module is used in the computation of the amplitude of the phase noise test signal. One of ordinary skill in the art will understand embodiments in which the amplitude is measured by a received signal strength indicator (RSSI) in the DDE.

In another example, embodiments have been described herein in which the transmission signal generation circuitry is assumed to a radio frequency synthesizer. One of ordinary skill in the art will understand embodiments in which this circuitry is an open loop oscillator (radio frequency oscillator) plus a digital-to-analog converter (DAC) or other suitable transmission signal generation circuitry.

In another example, embodiments have been described herein in which a real mixer is used for phase difference detection. One of ordinary skill in the art will understand embodiments in which the real mixer is replaced with a complex mixer or any suitable circuitry that can detect phase difference. In embodiments using a complex mixer, the value of $f_{IF2}$ can be set to 0.

In another example, embodiments have been described herein in which the cascaded radar system has a single slave radar SOC. One of ordinary skill in the art will understand embodiments in which the cascaded radar system includes multiple slave radar SOCs.

In another example, embodiments have been described herein in which the slave SOC measures phase noise in the master SOC. One of ordinary skill in the art will understand embodiments in which the roles of the slave SOC and the master SOC are reversed to test for a latent fault in the slave SOC, i.e., a failure in the phase noise measurement path. For example, if the mixer 242 in the slave SOC is not working, the radar system would still work, but the ability to catch a subsequent failure of the master RFSYNTH would be compromised. Latent faults are less important than single point faults (the failure of the RFSYNTH is the latter), but such faults are still relevant. Latent fault coverage of the slave test mixer 326 and the slave RFSYNTH 314 can be provided by reversing the entire process. Specifically, referring to FIG. 3, the output of the slave output buffer 318 may be coupled to the input of the master input buffer 306 and the roles of the master SOC and the slave SOC in the overall phase noise measurement may be reversed.

Certain terms are used throughout the description and the claims to refer to particular system components. As one skilled in the art will appreciate, components in radar systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A cascaded radar system comprising:
   a master radar system-on-a-chip (SOC) including first transmission signal generation circuitry operable to produce a first signal that includes phase noise; and
   a slave radar SOC coupled to an output of the master radar SOC to receive a first signal from the first transmission signal generation circuitry, the slave radar SOC including:
   second transmission signal generation circuitry operable to generate a first reference signal, and
   first phase detection circuitry including a linear mixer coupled to the first signal and coupled to the first reference signal, the first phase detection circuitry operable to generate a first phase noise test signal of a phase noise difference between the first signal and the first reference signal.

2. The cascaded radar system of claim 1, in which an output of the first phase detection circuitry is coupled to an input of a bandpass filter in a receiver channel of the slave radar SOC, the bandpass filter operable to filter the first phase noise test signal prior to measurement of the phase noise in the first phase noise test signal.

3. The cascaded radar system of claim 1, in which the master radar SOC is coupled to an output of the slave radar SOC to receive a second signal from the second transmission signal generation circuitry, the master radar SOC operable to measure phase noise in the second signal.

4. The cascaded radar system of claim 3, in which the first transmission signal generation circuitry is operable to generate a second reference signal for measuring phase noise in the second signal, and the master radar SOC includes second phase detection circuitry coupled to the output of the slave radar SOC and to an output of the first transmission signal generation circuitry to receive the second reference signal, the second phase detection circuitry operable to generate a second phase noise test signal of a phase difference between the second signal and the second reference signal.

5. The cascaded radar system of claim 3, in which the second phase detection circuitry is a linear mixer.

6. The cascaded radar system of claim 3, in which an output of the second phase detection circuitry is coupled to an input of a second bandpass filter in a receiver channel of the master radar SOC, the second bandpass filter operable to filter the second phase noise test signal.

7. The cascaded radar system of claim 1, in which the first transmission signal generation circuitry and the second transmission signal generation circuitry each include a radio frequency synthesizer.

8. The cascaded radar system of claim 1, in which the master radar SOC and the slave radar SOC are identical SOCs.

9. A method for phase noise measurement in a cascaded radar system, the method comprising:
   receiving a first signal that includes phase noise in a first radar device of the cascaded radar system, including generating the first signal in first transmission signal generation circuitry of a second radar device; and
   measuring the phase noise in the first signal in the first radar device, including:
      generating a reference signal by second transmission signal generation circuitry in the first radar device;
      generating a phase noise test signal as a phase noise difference of the first signal and the reference signal by first phase detection circuitry in the first radar device; and
      measuring the phase noise in the first signal based on the phase noise test signal.

10. The method of claim 9, in which measuring the phase noise in the signal based on the phase noise test signal includes:
   measuring an amplitude of the phase noise test signal;
   measuring total noise power of the phase noise test signal; and
   computing the phase noise based on the amplitude and the total noise power.

11. The method of claim 9, in which the first radar device and the second radar device are identical radar system-on-a-chip devices.

12. The method of claim 9, in which the first radar device is a slave radar system-on-a-chip (SOC) in a cascaded radar system and the second radar device is a master radar SOC in the cascaded radar system.

13. The method of claim 9, in which the first radar device is a master radar SOC in a cascaded radar system and the second radar device is a slave radar SOC in the cascaded radar system.

14. A radar device configured to operate in a normal mode and a phase noise measurement mode, the radar device comprising:
   first transmission signal generation circuitry operable to generate a reference signal when the radar device is in phase noise measurement mode and to generate signals for transmission when the radar device is in normal mode;
   an input buffer coupled to second transmission signal generation circuitry of another radar device to receive a signal for phase noise measurement from the second transmission signal generation circuitry when the radar device is in phase noise measurement mode;
   at least one receive channel including a baseband filter chain; and
   phase detection circuitry coupled to an output of the first transmission signal generation circuitry to receive the reference signal, to an output of the input buffer to receive the signal from the input buffer, and to an input of the baseband filter chain, the phase detection circuitry operable when the radar device is in phase noise measurement mode to generate a phase noise test signal of a phase difference between the signal and the reference signal and to send the phase noise test signal to the input of the baseband filter chain.

15. The radar device of claim 14, in which the radar device and the another radar device are identical radar system-on-a-chip devices.

16. The radar device of claim 14, in which the first transmission signal generation circuitry and the second transmission signal generation circuitry each include a radio frequency synthesizer.

17. The radar device of claim 14, in which the phase detection circuitry is a linear mixer.

* * * * *